United States Patent [19]
Tanaka

[11] Patent Number: 5,732,496
[45] Date of Patent: Mar. 31, 1998

[54] SIGN FRAME WITH IMPROVED CORNER DEVICES

[75] Inventor: Eiichi Tanaka, Tokyo, Japan

[73] Assignee: Marketing Displays, Inc., Farmington Hills, Mich.

[21] Appl. No.: 712,414

[22] Filed: Sep. 11, 1996

Related U.S. Application Data

[62] Division of Ser. No. 431,671, May 2, 1995, abandoned.

[51] Int. Cl.⁶ .................................................. G09F 1/12
[52] U.S. Cl. ............................ 40/784; 40/793; 403/403
[58] Field of Search .............................. 40/782, 783, 784, 40/785, 792, 793; 403/401, 402, 403, 205, 231, 382

[56] References Cited

U.S. PATENT DOCUMENTS

| | | |
|---|---|---|
| 1,049,830 | 1/1913 | Elyouszky . |
| 4,145,828 | 3/1979 | Hillstrom . |
| 4,205,486 | 6/1980 | Guarnacci . |
| 4,303,289 | 12/1981 | Hardy . |
| 4,356,648 | 11/1982 | Beaulieu . |
| 4,512,095 | 4/1985 | Seely . |
| 4,523,400 | 6/1985 | Seely . |
| 4,756,107 | 7/1988 | Hillstrom . |
| 4,839,974 | 6/1989 | Walter . |
| 4,877,213 | 10/1989 | Lambert ........................... 40/783 X |
| 4,937,959 | 7/1990 | Palmer et al. . |
| 4,958,458 | 9/1990 | Hillstrom et al. . |
| 5,076,736 | 12/1991 | Grewe et al. . |
| 5,307,575 | 5/1994 | Ivansson et al. ................. 40/793 |

*Primary Examiner*—Brian K. Green
*Attorney, Agent, or Firm*—Brooks & Kushman

[57] ABSTRACT

A corner member for a front-loading poster or picture frame is disclosed. The corner members are assembled between adjacent frame sections which have rotating cover members hingedly attached to base members. One or more raised protrusions or ridges are provided on the surfaces of the corner members adjacent the frame sections in order to provide improved manufacturing, assembly and operation of the frame. The raised ridges keep the cover members centered between the corner members and eliminate binding during opening and closing of the frame sections.

11 Claims, 2 Drawing Sheets

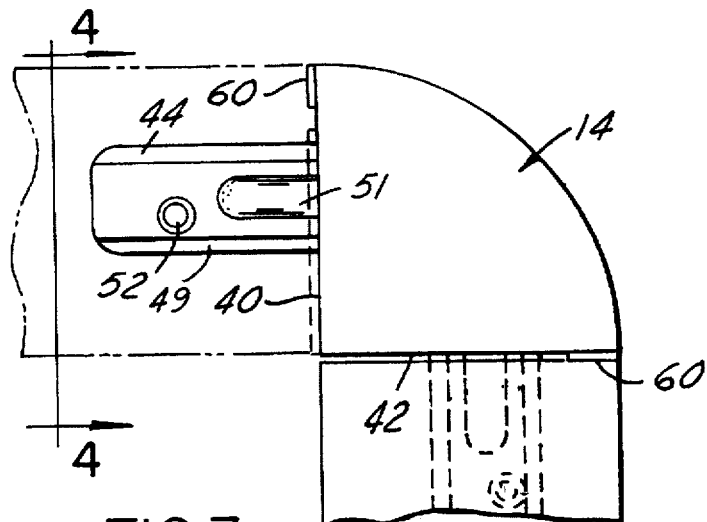
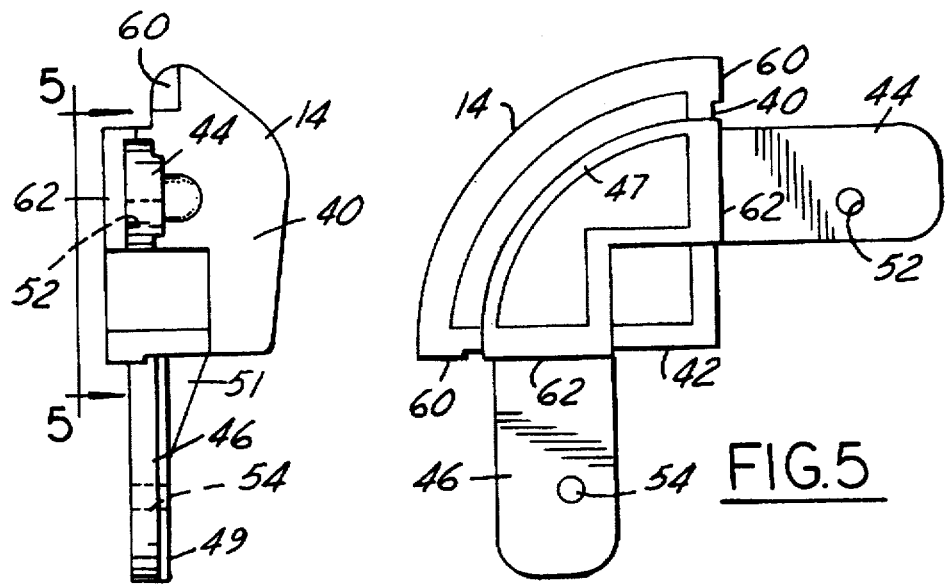
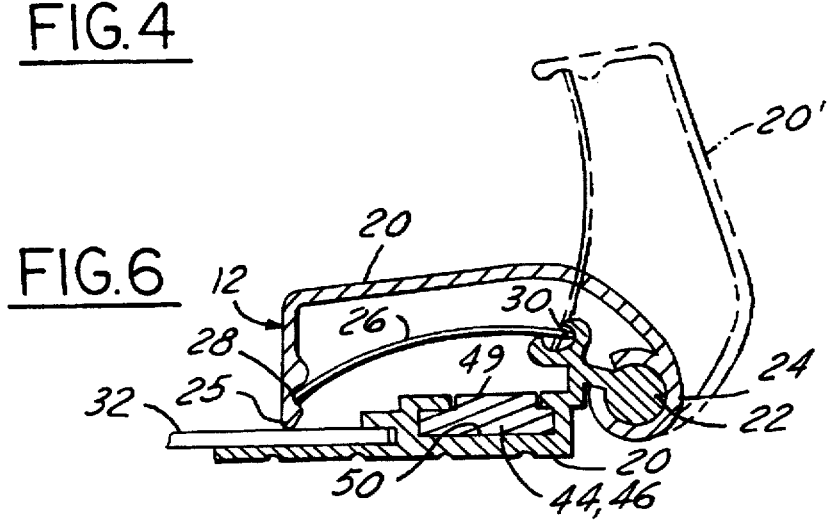

SIGN FRAME WITH IMPROVED CORNER DEVICES

This is a divisional of application Ser. No. 08/431,671 filed on May 2, 1995, now abandoned.

TECHNICAL FIELD

The present invention relates to front-loading poster and picture frames which have molded corner members and adjacent frame sections with hinged cover members.

BACKGROUND ART

Front-loading poster and picture frames are in widespread use today. They are used particularly by various businesses which change their advertising and promotional messages in a periodic manner. The frames also provide an aesthetic and attractive product and allow replacement and change of the promotional material in a quick and easy manner.

Front-loading poster frames are typically made of extruded aluminum or plastic frame sections, each comprising a base portion and cover member hinged together along one edge. With metal frame sections, a separate spring member is positioned between the base and cover members to bias the cover member in the closed position and hold the display materials in place. With plastic frame sections, the spring member is integrally molded between the base and cover members and also is used to bias the cover member in the closed position. With each of these embodiments, the spring members further function to hold the cover in its open position allowing easy replacement of the promotional materials. Frame sections and poster frames of these types are shown, for example, in commonly-owned U.S. Pat. Nos. 4,145,828, 5,076,736, and 5,307,575.

With some poster frames, the ends of the frame sections are cut on a 45° mitered angle to allow the frame sections to fit together to form the frame. Frames of this type are shown in the '828 and '575 patents. In other poster frames, a molded corner member is provided in order to provide a different aesthetic look to the poster frame and also to allow the ends of the frame sections to have square ends, thus eliminating mitered ends and associated problems therewith. Poster frames of this type are shown in the '736 patent.

Corner members such as those shown in the '736 patent provide an aesthetic corner assembly having a particular configuration, such as rounded or radiused corners for the poster frame. These corner members are typically made from plastic or similar materials and have integrally formed leg members for attachment to the adjacent frame sections. The interlocking leg members also can be formed as one or more separate members and affixed to the corner member.

The corner members, as shown in the '736 patent, can be provided as a single molded member or as two or more interlocking members. The corner members also have two flat faces 90° from one another which fit flush with the ends of the adjacent square end cut frame sections when the poster frame is assembled together.

Although the corner members described above have performed well and have provided an improved aesthetic appearance, it has been found in some instances that the cover members of the frame sections rub against the corner members, thereby hindering the opening and closing of the frame sections. To eliminate this problem, the cover members often are cut slightly shorter than the base members in order to provide some clearance. However, this creates additional manufacturing steps and expense, and also allows the cover members to slide relative to the base members, creating a larger undesirable gap at one end.

SUMMARY OF THE INVENTION

It is an object of the present invention to provide an improved corner member for a front-loading poster and picture frame. It is another object of the present invention to provide an improved molded corner assembly which eliminates the problems with known molded corner assemblies.

It is a further object of the present invention to provide an improved corner member for a front-loading poster and picture frame which allows the base member and cover member of each frame section to be cut to the same length and eliminates binding or rubbing of the cover members with the corner member. It is still another object of the present invention to provide an improved front-loading poster and picture frame which has corner members and reduces tolerance problems with the various parts of the assembly.

In accordance with the present invention, an improved front-loading poster and picture frame is provided. The frame has a plurality of frame sections positioned around the perimeter thereof with a plurality of corner members positioned in the corners. The frame sections each have a base member and a cover member hinged together along one edge. The corner members have connecting leg members which are secured to the frame sections in order to assemble the overall frame.

The corner members have a pair of surfaces positioned 90° from one another which come in contact with the ends of the frame sections. One or more ridge members or raised portions are provided on these surfaces which space one or more of the frame sections from the rest of the surfaces. The base members and cover members of each of the frame sections are cut to the same length and the cover members are evenly positioned between adjacent corner members.

The present invention allows the front-loading poster and picture frames to be manufactured and assembled in an easier and less costly manner, and also allows the poster and picture frames to be utilized more easily by the user in presenting and replacing advertising and promotional messages.

Other objects, features and advantages of the present invention will become apparent from the following description of the invention, when taken in conjunction with the accompanying drawings and appended claims.

BRIEF DESCRIPTION OF THE DRAWINGS

FIG. 3 is a partial elevational view of a corner portion of a picture and poster frame as shown in FIGS. 1 and 2;

FIG. 4 is a side elevational view of a corner member in accordance with the present invention when viewed in accordance with the direction of the arrows 4—4 in FIG. 3;

FIG. 5 is a bottom elevational view of a corner member in accordance with the present invention; and FIG. 6 is a cross-sectional view of a frame section in accordance with the present invention.

Best Mode For Carrying Out The Invention

Figure 1:
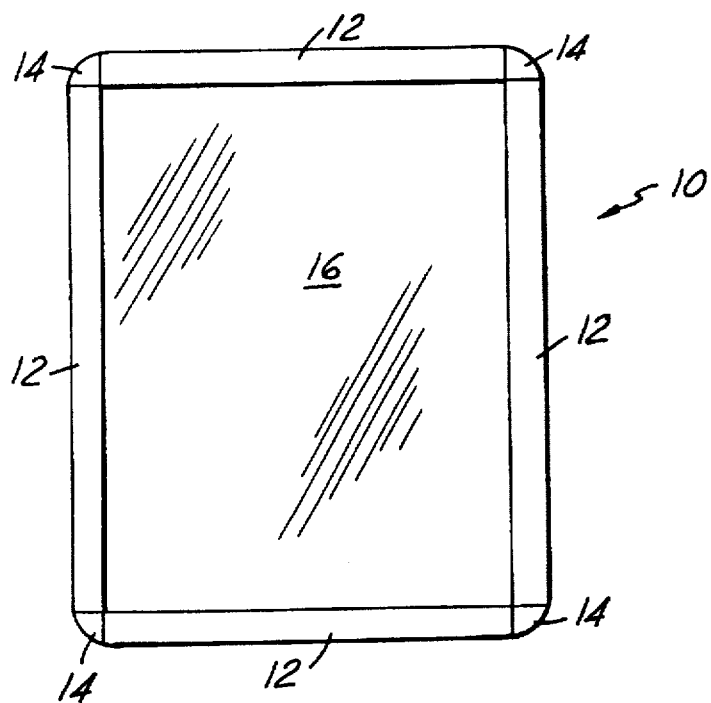
FIG. 1 illustrates a front-loading picture and poster frame which utilizes the present invention.

FIG. 1 illustrates a front-loading poster and picture frame 10. For ease of reference, the frame 10 will be hereinafter be referred to by the term "poster display device."

In general, the poster display device 10 includes a plurality of frame sections 12 positioned around its periphery, together with a plurality of corner members 14. Typically, four frame sections 12 are provided since poster display devices generally have a square or rectangular configuration. The corner members 14 help provide an aesthetic appearance and can have a rounded or radiused profile as desired.

The frame sections 12 are arranged in the configuration shown in FIG. 1 and are typically attached to a backing member 16 or the like. Since the poster display device is a front-loading poster and picture frame, the device 10 can be permanently secured to a wall or other structure.

Figure 2:
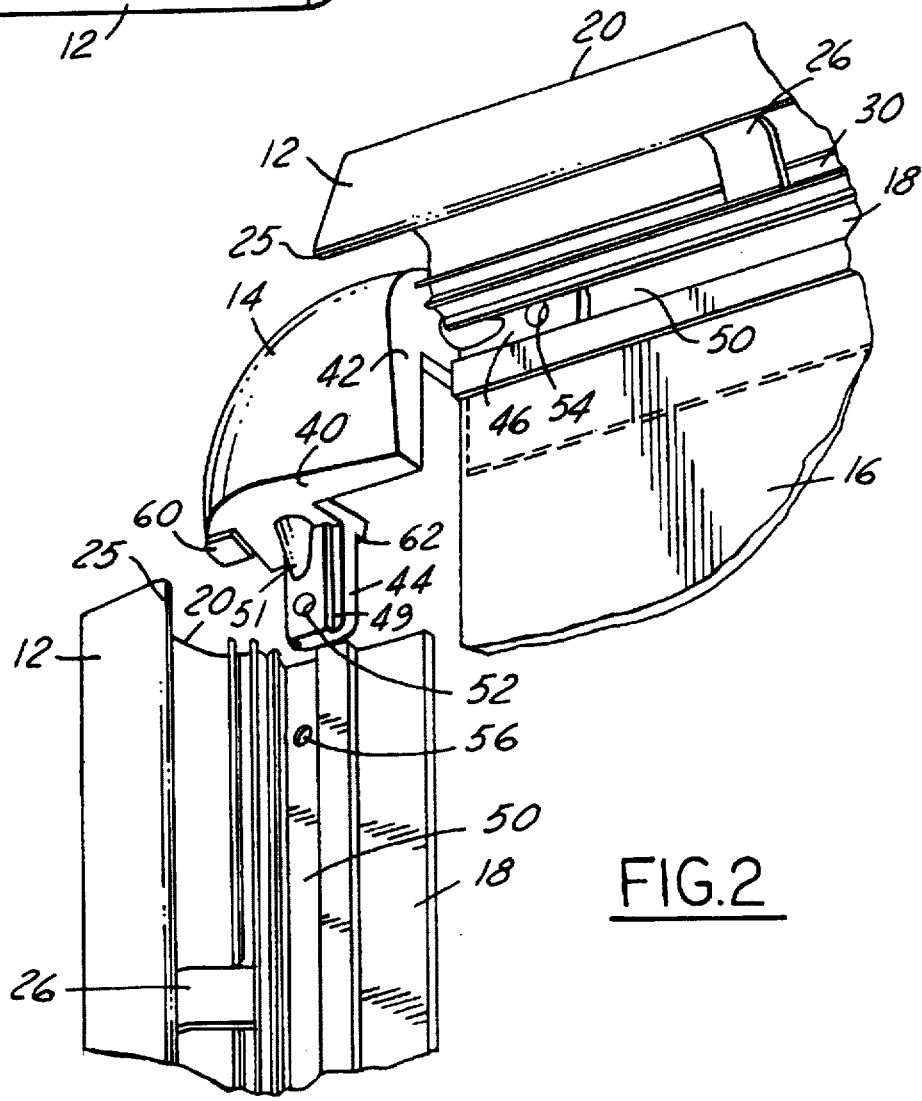
FIG. 2 is a partial, exploded perspective view of a corner portion of the picture and poster frame shown in FIG. 1.

As shown in FIGS. 2 and 6, and also as shown in U.S. Pat. Nos. 4,145,828, 5,307,575 and 5,076,736, the disclosures of which are hereby incorporated by reference, each of the frame sections 12 include a base member 18 and a cover member 20. The base members 18 and cover members 20 are hingedly secured together along one edge. The hinge mechanism comprises an elongated pintle (or "rail") member 22 which is positioned on the base member and a corresponding elongated socket or cup member 24 which is provided on the cover member. The structures of the pintle and socket members are such that the cover and base members are assembled by sliding one member longitudinally relative to the other.

The cover members 20 are biased by spring members 26 to the base members. Spring members 26 are positioned between recess 28 in the cover member and channel 30 in the base member 18.

In accordance with the '828 patent, the base member and cover member are preferably made from extruded aluminum material and provided in the cross-sectional sizes and shapes shown in FIG. 6. The spring biasing members 26 are preferably made from spring steel. When the cover members and base members are in their closed positions, as shown in FIG. 6, the spring members 26 act to hold them tightly together. This allows the frame sections to hold a poster or other promotional display member 32 in place in the poster display device 10. In order to change or replace the material 32, the cover members 20 are rotated to their open positions, as shown by phantom lines in FIG. 6 and identified by the number 20'. When the cover members of all of the frame sections on the perimeter of the frame assembly 10 are rotated to their open positions, the material 32 can be easily removed and replaced. When the cover members 20 are opened in the positions 20' shown in phantom in FIG. 6, the spring members 26 act to hold the cover members in that position.

Alternatively, the frame sections 12 can be made of an extruded plastic material, such as shown in U.S. Pat. Nos. 4,512,094 and/or 4,523,400, the disclosures of which are herein incorporated by reference. The plastic frame sections shown and disclosed in these patents also have a cover member and base member, but have an integrally formed spring member between them. The plastic frame sections operate in a similar manner, however, to hold or clamp poster advertising materials in place in the frame sections and also can be rotated such that the cover members are held in an open position in order to change or replace the materials.

The corner member 14 has two generally planar surfaces 40 and 42 which are positioned 90° from one another. Leg members 44 and 46 protrude outwardly from surfaces 40 and 42, respectively. The leg portions or members 44 and 46 are adapted to be inserted into channel members 50 formed in the base members 18 of the frame sections and thereby hold the corner members to the adjacent frame sections. Once the leg portions of the corner member are inserted in the channels 50, conventional fasteners (not shown) are installed to extend through openings 52 and 54 in the leg portions 44 and 46, respectively, and corresponding openings 56 in the channel members 50. These fasteners can be of any conventional type, such as pop rivets, bolts or screws, and preferably are small metal screws. When the fasteners are secured through the openings 52,54 in the corner member 14 and the corresponding openings 56 in the channel members 50, the corner members are then secured tightly to the frame sections 12. When all of the corner members are tightly secured to the frame sections in the same manner, the poster display device 10 comprises an integral rigid assembly.

Alternatively, the interlocking leg members can be provided as separate members or combined on an L-shaped bracket member, as shown in U.S. Pat. No. 5,076,736.

As shown in FIGS. 2–5, raised portions or ridges 60 and 62 are provided on each of the surfaces 40 and 42 of the corner members 14. Preferably these ridges are on the order of 0.020 inches in thickness and act to space the frame sections 12 from the remainder of the surfaces 40 and 42. Larger ridges could also be utilized, but they might cause undesirable gaps or spaces between the corner members and the frame sections. Also, it is possible within the scope of the present invention to only provide one raised ridge member 60 on each of the surfaces 40 and 42.

When the poster display device 10 is assembled, the base members 18 and cover members 20 are cut precisely to the same lengths. Prior to the present invention, it was customary to cut the cover members 20 approximately 0.040 inches shorter than the base members in order to provide appropriate clearance for the cover members.

When the poster display devices are assembled, the frame sections are first assembled together, that is, the cover members 20 are hingedly secured to the base members 18 to form each of the frame sections 12. Thereafter, each of the frame sections are connected to one of the leg members 44,46 of each of the corner members 14 and secured together by fasteners, as described above.

When assembled, the base members 18 are abutted tightly against the ridges 62 on the surfaces 40 and 42 of the corner members. Also, portions of the ends of the cover members 20 adjacent the socket or cup members 24 are abutted against the ridges 60 on the surfaces 40 and 42. This provides a clearance (preferably of approximately 0.020 inches) between the remainder of the surfaces 40 and 42 and the inside edges 25 of the cover members 20. The ridges 60 and 62 allow the base members to be held tightly against the corner members and also give clearance to the cover members to eliminate rubbing or binding.

Other portions of the corner members 14, such as reinforcing ribs and external structure and configurations, are similar to the corresponding portions of the corner members shown in U.S. Pat. No. 5,307,575, the disclosure of which is hereby incorporated by reference. For example, ridges or ribs 47 can be provided in the structure of the corner member for additional rigidity and support. In addition, the leg members can have stepped-upper portions 49 (as shown in FIGS. 2–4) to facilitate inserting and centering of the leg members in the channels 50 in the base member. Further, reinforcing ribs 51 can be provided between the surfaces 40 and 42 and the leg portions to provide increased strength and integrity for the corner members.

As indicated, the present invention allows the base members and cover members of each of the frame sections to be cut to the same length, thus eliminating an additional step in the manufacture and assembly of the poster display devices. Also, the present invention prevents the cover members from rubbing tightly against the entire flat side surfaces of the corner members, creating difficulties in the opening and closing of the frame sections. In addition, the present invention prevents the cover members from sliding axially (longitudinally) relative to the base members and abutting one of the adjacent corner members, thereby laving an unsightly gap adjacent the opposite corner member.

Though particular embodiments of the present invention have been illustrated in the accompanying drawings and described in the foregoing detailed description, it is to be understood that the present invention is not limited to just the embodiments disclosed, but they are capable of numerous rearrangements, modifications or substitutions without departing from the scope of the following claims

What is claimed is:

1. A poster frame comprising:

a plurality of frame sections positioned in a quadrilateral shape forming said poster frame;

each of said frame sections having a longitudinal axis and having ends perpendicular to said longitudinal axis;

each of said frame sections having a cover member and a counterpart base member hingedly attached together and a biasing member biasing said cover member relative to said base member;

a plurality of corner members, each of said corner members positioned in a corner of said poster frame and situated between a pair of adjacent frame sections;

each of said corner members having a body member and a pair of elongated connection members, said connection members securing said corner members to the base members of respective pair of adjacent frame sections;

said body members of each of said corner members having a generally quadrant shape with an upper surface, a lower surface, an outer surface, and two generally planar side surfaces;

said side surfaces abut one of the ends of said frame sections and said side surfaces having a first raised ridge member thereon which makes contact with the cover member of an adjacent frame section;

whereby, said frame sections remain centered between pairs of corner members and opening and closing of said cover members is enhanced.

2. The poster frame as set forth in claim 1 further comprising a second raised ridge member on each of said side surfaces of said body members, said second ridge member making contact with an adjacent base member.

3. The poster frame as set forth in claim 1 wherein said first raised ridge member protrudes from said side surface substantially less than said connector members.

4. The poster frame as set forth in claim 1 wherein said first raised ridge member protrudes approximately 0.020 inches from said side surface.

5. The poster frame as set forth in claim 1 wherein said first raised ridge member has an outer planar surface thereon which makes contact with the adjacent cover member in order to space said cover member from said side surface and prevent binding or rubbing during opening and closing of said frame sections.

6. The poster frame as set forth in claim 1 wherein said body members have a curved outer surface forming a poster frame with curved outer corners.

7. A poster frame comprising:

a plurality of frame sections and corner members assembled together;

each of said frame sections having a cover member and counterpart base member hingedly attached together and a biasing member biasing said cover member relative to said base member;

said corner members each having a body portion and a pair of connection members extending outwardly therefrom for mating with said frame sections;

said body portion having a generally quadrant shape with an upper surface, a lower surface, an outer surface and two planar side surfaces positioned 90° to each other and connecting said upper surface, said lower surface and said curved outer surface to form said body portion;

a pair of raised ridge members on each of said planar side surfaces, each of said ridge members each having a planar surface thereon which is substantially parallel to a corresponding planar side surface;

said ridge members making contact with adjacent cover members and base members of the frame sections and spacing said cover members and base members slightly from said side surfaces of said corner members in order to enhance the opening and closing of said cover members.

8. The poster frame as set forth in claim 7 wherein one of said ridge members of each pair of ridge members contacts an adjacent base member and the other of said ridge members of each pair of ridge members contacts a portion of an adjacent cover member.

9. The poster frame as set forth in claim 7 wherein said outer surface of said body portion is curved forming a poster frame with curved outer corners.

10. The poster frame as set forth in claim 7 wherein said connector members extending outwardly from said side surfaces substantially greater in distance than said raised ridge members.

11. The poster frame as set forth in claim 7 wherein one of said raised ridge members protrudes approximately 0.020 inches from said planar side surface.

* * * * *